United States Patent
Larsen et al.

(10) Patent No.: US 10,352,778 B2
(45) Date of Patent: Jul. 16, 2019

(54) COMPOSITE ACTIVE WAVEGUIDE TEMPERATURE SENSOR FOR HARSH ENVIRONMENTS

(71) Applicant: Etegent Technologies LTD., Cincinnati, OH (US)

(72) Inventors: Christopher G. Larsen, Cincinnati, OH (US); Oleg Lobkis, Mason, OH (US); Richard A. Roth, Goshen, OH (US); Stuart J. Shelley, Cincinnati, OH (US)

(73) Assignee: ETEGENT TECHNOLOGIES, LTD., Cincinnati, OH (US)

( * ) Notice: Subject to any disclaimer, the term of this patent is extended or adjusted under 35 U.S.C. 154(b) by 295 days.

(21) Appl. No.: 15/033,383

(22) PCT Filed: Oct. 31, 2014

(86) PCT No.: PCT/US2014/063409
§ 371 (c)(1),
(2) Date: Apr. 29, 2016

(87) PCT Pub. No.: WO2015/099884
PCT Pub. Date: Jul. 2, 2015

(65) Prior Publication Data
US 2016/0273973 A1    Sep. 22, 2016

Related U.S. Application Data

(60) Provisional application No. 61/898,799, filed on Nov. 1, 2013.

(51) Int. Cl.
*G01K 11/22* (2006.01)
*G01K 13/02* (2006.01)
(Continued)

(52) U.S. Cl.
CPC .............. *G01K 11/22* (2013.01); *F02D 35/02* (2013.01); *G01K 13/02* (2013.01); *G10K 11/24* (2013.01); *G01K 2013/024* (2013.01)

(58) Field of Classification Search
CPC .. G01K 11/22; G01K 13/02; G01K 2013/024; F02D 35/02; G10K 11/24
See application file for complete search history.

(56) References Cited

U.S. PATENT DOCUMENTS

| | | |
|---|---|---|
| 801,103 A | 10/1905 | Barclay |
| 2,968,943 A | 1/1961 | Statham |
| (Continued) | | |

FOREIGN PATENT DOCUMENTS

| | | |
|---|---|---|
| DE | 2521411 | 11/1976 |
| DE | 102005100114402 | 9/2006 |
| (Continued) | | |

OTHER PUBLICATIONS

Kulite, Static-Dynamic Transducer, Jun. 17, 2009 (6 pages).
(Continued)

*Primary Examiner* — Lisa M Caputo
*Assistant Examiner* — Philip L Cotey
(74) *Attorney, Agent, or Firm* — Middleton Reutlinger (57) ABSTRACT

A composite active waveguide temperature sensor (10) incorporates a first, sensor portion (16) formed of an environment-resistant material such as ceramic coupled through an ultrasonically-transparent bond (20) to a second, waveguide portion (18) formed of an ultrasonically-transmissive material such as a metallic filament wire. By doing so, the sensor portion (16) may be positioned within a harsh environment and subjected to a temperature to be measured, and the waveguide portion (18) may be used to propagate ultrasonic energy to and/or from the sensor portion (16) to a location distal from the harsh environment for measure- (Continued)

ment of the temperature. The ultrasonically-transparent bond (20) between these portions (16, 18) limits attenuation of and the introduction of reflections and other noise to an ultrasonic signal propagated across the bond (20).

30 Claims, 3 Drawing Sheets

(51) Int. Cl.
*F02D 35/02* (2006.01)
*G10K 11/24* (2006.01)

(56) References Cited

U.S. PATENT DOCUMENTS

| | | | |
|---|---|---|---|
| 3,071,974 A | 1/1963 | Peterson | |
| 3,079,800 A | 3/1963 | Hoar | |
| 3,201,735 A | 8/1965 | Brown et al. | |
| 3,584,327 A | 6/1971 | Murry et al. | |
| 3,915,018 A | 10/1975 | Karplus | |
| 3,940,637 A | 2/1976 | Ohigashi et al. | |
| 4,149,422 A | 4/1979 | Olsen et al. | |
| 4,165,651 A | 8/1979 | Olsen et al. | |
| 4,165,652 A | 8/1979 | Olsen et al. | |
| 4,336,719 A | 6/1982 | Lynnworth | |
| 4,414,652 A | 11/1983 | Crist | |
| 4,452,334 A | 6/1984 | Rogers | |
| 4,499,438 A | 2/1985 | Cornelius et al. | |
| 4,603,942 A | 8/1986 | Chang et al. | |
| 4,610,551 A | 9/1986 | Shah | |
| 4,650,346 A * | 3/1987 | Tehon | G01K 11/26 374/117 |
| 4,663,965 A | 5/1987 | Metcalf et al. | |
| 4,667,097 A | 5/1987 | Fasching et al. | |
| 4,676,663 A * | 6/1987 | Tehon | G01K 11/24 374/117 |
| 4,743,870 A | 5/1988 | Jen et al. | |
| 4,783,997 A | 11/1988 | Lynnworth | |
| 4,743,752 A | 12/1988 | Olsen et al. | |
| 4,800,316 A | 1/1989 | Ju-Zhen | |
| 4,823,600 A | 4/1989 | Biegel et al. | |
| 4,939,457 A * | 7/1990 | Tellerman | G01F 23/2963 324/207.13 |
| 5,003,825 A | 4/1991 | Lew | |
| 5,022,014 A | 6/1991 | Kulczyk et al. | |
| 5,159,838 A | 11/1992 | Lynnworth | |
| 5,545,984 A | 8/1996 | Gloden et al. | |
| 5,670,720 A | 9/1997 | Clark et al. | |
| 5,713,916 A | 2/1998 | Dias | |
| 5,821,430 A | 10/1998 | Kwun et al. | |
| 5,821,743 A | 10/1998 | Page et al. | |
| 5,897,569 A | 4/1999 | Kellogg et al. | |
| 5,962,790 A | 10/1999 | Lynnworth et al. | |
| 6,047,602 A | 4/2000 | Lynnworth | |
| 6,081,638 A | 6/2000 | Zhou | |
| 6,232,769 B1 * | 5/2001 | Brunsch | G01D 5/485 324/207.13 |
| 6,281,976 B1 | 8/2001 | Taylor et al. | |
| 6,343,511 B1 | 2/2002 | Lynnworth et al. | |
| 6,413,103 B1 | 7/2002 | Merz et al. | |
| 6,889,552 B2 | 5/2005 | Nguyen et al. | |
| 6,912,907 B2 | 7/2005 | Fujimoto | |
| 6,919,779 B2 | 7/2005 | Raphalovitz et al. | |
| 6,975,179 B2 | 12/2005 | Harris | |
| 7,016,047 B2 | 3/2006 | May | |
| 7,017,415 B2 | 3/2006 | Harrold et al. | |
| 7,162,925 B2 | 1/2007 | Dietrich | |
| 7,258,014 B2 | 8/2007 | Rudkin | |
| 7,414,410 B2 | 8/2008 | Pham et al. | |
| 7,454,978 B2 | 11/2008 | Schroeder et al. | |
| 7,952,360 B2 | 5/2011 | Ganesh | |
| 2002/0130253 A1 | 9/2002 | Yashiro et al. | |
| 2003/0056595 A1 * | 3/2003 | Harrold | F01D 21/045 73/660 |
| 2004/0119552 A1 | 6/2004 | Wray | |
| 2005/0144955 A1 * | 7/2005 | Handelsman | F23N 5/16 60/772 |
| 2005/0238301 A1 | 10/2005 | Russell et al. | |
| 2006/0290356 A1 | 12/2006 | Pham et al. | |
| 2008/0090023 A1 | 4/2008 | Nayar et al. | |
| 2008/0307885 A1 | 12/2008 | Ravitch et al. | |
| 2009/0314088 A1 * | 12/2009 | Djordjevic | G01N 29/028 73/602 |
| 2011/0314919 A1 | 12/2011 | Ehlert | |
| 2012/0242426 A1 | 9/2012 | Larsen et al. | |
| 2012/0325018 A1 | 12/2012 | Roth et al. | |
| 2014/0144156 A1 * | 5/2014 | Lang | G01K 11/24 60/793 |

FOREIGN PATENT DOCUMENTS

| | | |
|---|---|---|
| DE | 102007062864 A1 | 6/2009 |
| EP | 0053036 | 6/1982 |
| EP | 0467818 | 1/1992 |
| EP | 1014525 | 6/2000 |
| EP | 1238715 | 9/2002 |
| EP | 1566815 | 8/2005 |
| GB | 2114297 | 8/1983 |
| JP | 61061027 | 3/1986 |
| WO | 2007136040 | 11/2007 |
| WO | 2013053699 | 4/2013 |

OTHER PUBLICATIONS

Hunter, Gary W., Development and Application of High Temperature Sensors and Electronics, NASA Glenn Research Center, Cleveland, OH (26 pages).
Ned, Alexander A.; Kurtz, Dr. Anthony D.; Masheeb, Fawzia; Beheim, Glenn, Leadless SiC Pressure Sensors for High Temperature Applications, 2001 (6 pages).
Ned, Alexander A.; Kurtz, Anthony D.; Beheim, Glenn; Masheeb, Fawzia; Stefanescu, Sorin; Improved SiC Leadless Pressure Sensors for High Temperature Low and High Pressure Applications; Kulite Semiconductor Products, Inc., presented at the 21st Transducer Workshop, Lexington Park, MD, Jun. 22-23, 2004 (7 pages).
Wijesundara, Muthu, Recent Progress in SiC Sensors and Microsystems for Harsh Environments (19 pages).
Inagaki, K.; Kolosov, O.V.; Briggs, G. A. D.; Wright, 0. B.; Waveguide ultrasonic force microscopy at 60 MHz; Applied Physics Letters, vol. 76, No. 14, Apr. 3, 2000 (3 pages).
Schuet, S; Wheeler, K; Timucin, D.; Kowalski, M.; Wysocki, P.; Introduction & Motivation Characterization of Chafing Damage Model Based Inference, Model Based Inference for Wire Chafe Diagnostics, Intelligent Systems Division, NASA Ames Research Center, Moffett Field, California, Aging Aircraft 2009 (30 pages).
Rose, Joseph L., A Baseline and Vision of Ultrasonic Guided Wave Inspection Potential, Journal of Pressure Vessel Technology, Aug. 2002, vol. 124, pp. 273-282.
Neill, Ian T.; Oppenheim, I. J.; Greve, D.W.; A Wire-Guided Transducer for Acoustic Emission Sensing, Sensors and Smart Structures Technologies for Civil, Mechanical, and Aerospace Systems, 2007, Proc. of SPIE vol. 6529 652913-1 (8 pages).
Stobbe, David M., Acoustoelasticity in 7075-1651 Aluminum and Dependence of Third Order Elastic Constants on Fatigue Damage, A thesis Presented to the Academic Faculty, School of Mechanical Engineering, Georgia Institute of Technology, Aug. 2005 (91 pages).
Ali, M.G.S., Analysis of Broadband Piezoelectric Transducers by Discrete Time Model, Egypt. J. Sol., vol. (23), No. (2), (2000), pp. 287-295.
Greve, David W.; Sohn, Hoon; Yue, C. Patrick; Oppenheim, Irving J., An Inductively Coupled Lamb Wave Transducer, IEEE Sensors Journal, vol. 7, No. 2, Feb. 2007, pp. 295-301.
Huang, Bin; Shung, K. Kik, Characterization of very high frequency transducers with wire target and hydrophone, Institute of Physics Publishing, Journal of Physics: Conference Series 1 (2004) 161-166.

(56) References Cited

OTHER PUBLICATIONS

Hollman, Kyle W.; Holland, Mark R.; Miller, James G.; Nagy, Peter B.; Rose, James H., Effective Ultrasonic transmission coefficient for randomly rough surfaces, J. Acoust. Soc. Am. 100 (2), Pt. 1, Aug. 1996, pp. 832-839.
Kwun, Hegeon; Bartels, Keith A.; Hanley, John J., Effects of tensile loading on the properties of elastic-wave propagation in a strand, J. Acoust. Soc. Am 103 (6), Jun. 1998, pp. 3370-3375.
Nieuwenhuis, J. H.; Neumann, J.; Greve, D.W.; Oppenheim, U., Generation and detection of guided waves using PZT wafer transducers, Nov. 2005 (19 pages).
Chaki, S.; Bourse, G., Guided ultrasonic waves for non-destructive monitoring of the stress levels in prestressed steel strands, Ultrasonics 49 (2009) 162-171.
Li, Qiuhua; Lieh, Junghsen; Mayer, A, Large deflection of laminated circular plates with clamed edge and uniform loading, Proc. IMechE vol. 219 Part E: J. Process Mechanical Engineering (2005) (6 pages).
Sheplak, Mark; Dugundji, John, Large Deflections of Clamped Circular Plates Under Initial Tension and Transitions to Membrane Behavior, Journal of Applied Mechanics, 1998 (28 Pages).
Behbahani, Alireza R., Need for Robust Sensors for Inherently Fail-Safe Gas Turbine Engine Controls, Monitoring, and Prognostics, May 7, 2006 through Thursday, May 11, 2006, ISA2006, 52nd International Instrumentation Symposium—Cleveland, OH (37 pages).
di Scalea, Francesco Lanza; Rizzo, Piervincenzo; Seible, Frieder, Stress Measurement and Defect Detection in Steel Strands by Guided Stress Waves, Journal of Materials in Civil Engineering © ASCE/May/Jun. 2003, pp. 219-227.
Miklowitz, Julius, The Theory of Elastic Waves and Waveguides, North-Holland Series in Applied Mathematics and Mechanics, vol. 22, 1978 (634 pages).
Nagy, Peter B.; Kent, Renee M., Ultrasonic assessment of Poisson's ratio in thin rods, J. Acoust. Soc. Am. 98 (5), Pt. 1, Nov. 1995, pp. 2694-2701.
Konkov, E., Ultrasonic Interferometer for High-Accuracy Linear Measurements, Measurement Science Review, vol. 9, No. 6, 2009, pp. 187-188.
Kurtz, Dr. Anthony D., "Miniature Absolute Pressure Transducer," AFSBIR, Control No. F031-1261 (2003).
Nicholson, N.C. and McDicken, W.N., "Waveguides in medical ultrasonics: effect of waveguide medium upon model amplitude," Ultrasonics 1992 vol. 30, No. 2. (pp. 82-86).
Spratt, William K.; Vetelino, John F.; Lynnworth, Lawrence C., "Torsional Ultrasonic Waveguide Sensor," 2010 IEEE International Ultrasonics Symposium Proceedings (pp. 702-706).
Loveday, Philip W., "Analysis of Piezoelectric Ultrasonic Transducers Attached to Waveguides Using Waveguide Finite Elements," IEEE Transactions on Ultrasonics, Ferroelectrics, and Frequency Control, vol. 54, No. 10, Oct. 2007 (pp. 2045-2051).
Lee, Jung-Ryul and Tsuda, Hiroshi, "Sensor application of fibre ultrasonic waveguide," Meas. Sci. Technol. 17 (2006) pp. 645-652.
Cegla, F.B.; Cawley, P., "Ultrasonic Waveguides for Remote High Temperature NDT," Non-Destructive Testing Group, Department of Mechanical Engineering, Imperial College London SW7 2AZ, United Kingdom.
Redwood, Martin, Mechanical waveguides; the propagation of acoustic and ultrasonic waves in fluids and solids with boundaries, New York, Pergamon Press. 1960.
Written Opinion of the International Searching Authority for PCT/US2012/043766, dated Nov. 21, 2012.
International Search Report and Written Opinion of PCT Ser. No. PCT/US14/63463 dated Mar. 26, 2015.
International Search Report and the Written Opinon for PCT/US2014/63409, dated Jun. 24, 2015.
International Search Report and the Written Opinion for PCT/US2015/25043, dated Aug. 4, 2015.
U.S. Patent and Trademark Office, Restriction issued in related U.S. Appl. No. 13/166,594, dated Oct. 25, 2013.
U.S. Patent and Trademark Office, Restriction issued in related U.S. Appl. No. 13/166,594, dated Mar. 14, 2014.
U.S. Patent and Trademark Office, Office Action issued in related U.S. Appl. No. 13/166,594, dated Jul. 24, 2014.
U.S. Patent and Trademark Office, Final Office Action issued in related U.S. Appl. No. 13/166,594, dated Feb. 17, 2015.
U.S. Patent and Trademark Office, Advisory Action issued in related U.S. Appl. No. 13/166,594, dated May 14, 2015.
U.S. Patent and Trademark Office, Office Action issued in related U.S. Appl. No. 13/166,594, dated Jun. 19, 2015.
U.S. Patent and Trademark Office, Notice of Allowance issued in related U.S. Appl. No. 13/166,594, dated Aug. 7, 2015.
U.S. Patent and Trademark Office, Notice of Allowance issued in related U.S. Appl. No. 13/166,594, dated Sep. 17, 2015.
U.S. Patent and Trademark Office, Office Action issued in related U.S. Appl. No. 13/071,159, dated Apr. 23, 2014.
U.S. Patent and Trademark Office, Final Office Action issued in related U.S. Appl. No. 13/071,159, dated Oct. 24, 2014.
U.S. Patent and Trademark Office, Notice of Allowance issued in related U.S. Appl. No. 13/071,159, dated Apr. 15, 2015.
International Search Report and Written Opinion of PCT Ser. No. PCT/US14/63409 dated Jun. 24, 2015.
U.S. Patent and Trademark Office, Office Action issued in related U.S. Appl. No. 15/033,350, dated Jun. 29, 2018.

* cited by examiner

COMPOSITE ACTIVE WAVEGUIDE TEMPERATURE SENSOR FOR HARSH ENVIRONMENTS

CROSS-REFERENCE TO RELATED APPLICATIONS

This application claims the benefit of and priority to U.S. Provisional Application Ser. No. 61/898,799 filed on Nov. 1, 2013 by Christopher G. Larsen et al., and entitled "COMPOSITE ACTIVE WAVEGUIDE TEMPERATURE SENSOR FOR HARSH ENVIRONMENTS," which application is incorporated by reference in its entirety.

GOVERNMENT RIGHTS

Certain aspects of this invention were made with government support under Grant/Contract No. N68335-11-C-0203 and N68335-11-C-0385 awarded by United States Navy. The U.S. Government may have certain rights in the invention.

FIELD OF THE INVENTION

The present invention relates to temperature sensing technology, and more particularly to temperature sensors and sensing methods using active waveguides.

BACKGROUND OF THE INVENTION

Many conventional mechanical systems are monitored to determine operating conditions such as pressure, temperature, vibrations, etc. However, in many systems it is desirable to monitor and measure operating conditions at locations in the system where it is extremely difficult to do so. For example, the measurement environment may be a harsh environment in which sensors are unable to operate reliably. For example, monitoring a gas turbine engine presents unique challenges due to the harsh environmental conditions of the engine, i.e., high temperatures, high pressures, and high vibrations a sensor is subjected to during operation of the engine. In mechanical systems, conventional sensors used to monitor operating conditions in harsh environments often fail at an extremely high rate and lead to high maintenance costs in maintaining the mechanical system due to limits associated with the materials required to construct the sensors. In addition, conventional sensors typically require a variety of materials bonded together, and the varying limits associated with the varying materials may further complicate sensor design, and may also lead to increased failure rates due to some required materials having different thermal expansion rates that can introduce large mechanical strains. In addition, some conventional sensors such as thermocouples can be susceptible to sensor drift in harsh environments.

Conventional methods of dealing with the above issues typically involve acknowledging the limits associated with a sensor, the lifetime of the sensor, and that its lifetime and measurement capabilities are limited by the environment within which it is configured. In some systems, conventional methods of dealing with the above issues typically involve fixing a sensor in a location remote from the desired sensing location and estimating operating conditions at the desired sensing location based on the data collected from the remote position.

Sensors have also been developed utilizing a single material to minimize thermal strains and the challenges associated with bonding dissimilar materials, as well as one or more wires coupled to and/or integrated with the sensors and functioning as active mechanical waveguides through which ultrasonic signals may be propagated and sensed to measure the environmental conditions, e.g., pressure, force, strain, temperature, etc., to which the sensors are subjected. In some instances, the wires may be tensioned and/or coupled to one or more diaphragms such that pressure differences or other forces deflect the diaphragms and induce varying tension and/or elongation of the wires, which in turn vary the ultrasonic signal transmission characteristics of the wires in a measurable manner.

Nonetheless, in some instances, various environmental conditions can contribute to the ultrasonic signal transmission characteristics of the wires used as active mechanical waveguides, resulting in a need to compensate for some environmental conditions when attempting to measure other environmental conditions.

In addition, in some instances, generating and detecting ultrasonic energy in the wires used as active mechanical waveguides, and in particular, transmitting ultrasonic energy to an active waveguide wire from a transducer and/or receiving ultrasonic energy from an active waveguide wire with a receiver can be subject to energy losses that reduce signal strength and lower the signal to noise ratio.

Consequently, there is a continuing need for improved sensors and sensing methods to address these and other difficulties with conventional sensor technology.

SUMMARY OF THE INVENTION

Embodiments of the invention are generally directed to a composite active mechanical waveguide temperature sensor that incorporates a first, sensor portion formed of an environment-resistant material such as ceramic coupled through an ultrasonically-transparent bond to a second, waveguide portion formed of an ultrasonically-transmissive material such as a metallic filament wire. By doing so, the sensor portion may be positioned within a harsh environment and subjected to a temperature to be measured, and the waveguide portion may be used to propagate ultrasonic energy (e.g., ultrasonic stress waves) to and/or from the sensor portion to a location distal from the harsh environment for measurement of the temperature. The ultrasonically-transparent bond between these portions limits attenuation of and the introduction of reflections and other noise to an ultrasonic signal propagated across the bond.

Therefore, consistent with one aspect of the invention, a composite sensor includes a sensor portion formed of an environment-resistant material for sensing an environmental condition in a harsh environment; and a waveguide portion formed of an ultrasonically-transmissive material and coupled to the sensor portion through an ultrasonically-transparent bond.

Consistent with another aspect of the invention, a temperature sensor includes a sensor portion formed of an environment-resistant material and configured to be mounted to a turbine and exposed to a combustion chamber in the turbine, a waveguide portion formed of a metal wire filament having a diameter of less than about 0.125" and coupled to the sensor portion through an ultrasonically-transparent bond, and a transducer coupled to the waveguide portion at an opposite end from the sensor portion and configured to propagate an ultrasonic signal of at least about 200 kHz through the sensor to measure an ultrasonic signal transmission characteristic of the sensor that varies in response to temperature in the combustion chamber.

Consistent with another aspect of the invention, an apparatus includes a composite sensor including a sensor portion formed of an environment-resistant material for sensing an environmental condition in a harsh environment and a waveguide portion formed of an ultrasonically-transmissive material and coupled to the sensor portion through an ultrasonically-transparent bond, and control logic configured to generate an ultrasonic signal and propagate the ultrasonic energy through the composite sensor, where the control logic is further configured to sense the ultrasonic energy propagated through the composite sensor and determine the environmental condition based upon the sensed ultrasonic energy.

Consistent with a further aspect of the invention, a method is provided for measuring an environmental condition in a harsh environment with a composite sensor of the type that includes a sensor portion formed of an environment-resistant material and a waveguide portion formed of an ultrasonically-transmissive material and coupled to the sensor portion through an ultrasonically-transparent bond. The method includes sensing ultrasonic energy propagated through the composite sensor, and determining the environmental condition based upon the sensed ultrasonic energy.

Consistent with yet another aspect of the invention, a composite temperature sensor includes a sensor portion formed of an environment-resistant ceramic material for sensing temperature in a harsh environment, the sensor portion have a first, sensing end, and a second, mating end, and an ultrasonic transducer coupled directly to the mating end of the sensor portion through an ultrasonically-transparent bond.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments of the invention are generally directed to a composite active mechanical waveguide temperature sensor suitable for use in hostile environments, in which ultrasonic signals propagated through the composite active waveguide temperature sensor may be monitored to determine temperature based at least in part on characteristics of the communicated signals. Other embodiments incorporating the functionality discussed herein may be capable of measuring other environmental conditions, e.g., conditions such as pressure, force, acceleration, strain, and/or vibration. Further details regarding various waveguide sensor designs that may utilize the herein-described improvements are described in U.S. Patent Publication No. 2012/0325018 by Richard Allan Roth, II et al., which is assigned to Etegent Technologies Ltd. (the same assignee as the present application), and which is incorporated by reference herein in its entirety.

In some embodiments, a composite sensor may include a sensor portion formed of an environment-resistant material for sensing an environmental condition in a harsh environment and a waveguide portion formed of an ultrasonically-transmissive material and coupled to the sensor portion through an ultrasonically-transparent bond.

In some embodiments, the environment-resistant material is a ceramic material, and in some embodiments, the environment-resistant material is a refractory material. In some embodiments, the ultrasonically-transmissive material is a metal, and in some embodiments, the ultrasonically-transmissive material comprises a steel wire filament.

In some embodiments, a cone couples the waveguide portion to a transducer at an end opposite to the ultrasonically-transparent bond, and in some embodiments, the ultrasonic bond comprises a bond formed by brazing, soldering, adhesive, press-fit, or mechanical fastening. In some embodiments, the harsh environment is a high temperature environment, while in some embodiments, the harsh environment is a high pressure environment, a caustic environment, or an erosive environment.

In some embodiments, the waveguide portion has a diameter of less than about 0.125" and is transmissive of an ultrasonic signal of at least about 200 kHz. In addition, in some embodiments, the sensor is adapted to sense temperature in a turbine combustion chamber. In some embodiments, a sensor additionally includes at least one reflection point defining at least one sensing region for sensing the environmental condition, and in some embodiments, the at least one reflection point includes a reflection point in the sensor portion, while in some embodiments, the at least one reflection point includes a reflection point in the waveguide portion.

In some embodiments, the sensor portion includes a sensor component joined to a transition component through an ultrasonically-transparent bond, and in some embodiments, the sensor component and the transition components are formed of the same material. In some embodiments, the sensor component and the transition components are formed of different materials, and in some embodiments, the sensor component is formed of a ceramic material and the transition component is formed of a nickel-chromium alloy.

In some embodiments, the sensor additionally includes a mounting plate welded to the transition component, and in some embodiments, the sensor component is brazed to the transition component. In some embodiments, a mating end of the sensor component is received in a cup defined on a mating end of the transition component, and in some embodiments, a mating end of the sensor component has an inverse V configuration and a corresponding mating end of the transition component has a V configuration such that the mating end of the sensor component is received in the mating end of the transition component.

In some embodiments, a temperature sensor may include a sensor portion formed of an environment-resistant material and configured to be mounted to a turbine engine and exposed to a combustion chamber in the turbine, a waveguide portion formed of a metal wire filament having a diameter of less than about 0.125" and coupled to the sensor portion through an ultrasonically-transparent bond, and a transducer coupled to the waveguide portion at an opposite end from the sensor portion and configured to propagate an ultrasonic signal of at least about 200 kHz through the sensor to measure an ultrasonic signal transmission characteristic of the sensor that varies in response to temperature in the combustion chamber.

In still other embodiments, an apparatus may include a composite sensor including a sensor portion formed of an environment-resistant material for sensing an environmental condition in a harsh environment and a waveguide portion formed of an ultrasonically-transmissive material and coupled to the sensor portion through an ultrasonically-transparent bond, and control logic configured to generate an ultrasonic signal and propagate the ultrasonic energy through the composite sensor, the control logic further configured to sense the ultrasonic energy propagated through the composite sensor and determine the environmental condition based upon the sensed ultrasonic energy.

In yet other embodiments, a method of measuring an environmental condition in a harsh environment with a composite sensor of the type that includes a sensor portion formed of an environment-resistant material and a waveguide portion formed of an ultrasonically-transmissive material and coupled to the sensor portion through an ultrasonically-transparent bond may include sensing ultrasonic energy propagated through the composite sensor, and determining the environmental condition based upon the sensed ultrasonic energy. In some embodiments, determining the environmental condition based upon the sensed ultrasonic energy comprises determining the environmental condition based upon time of flight, resonant frequency, or phase. In some embodiments, the sensor portion includes first and second reflection points defined respectively at an end and an intermediate location on the sensor portion, and determining the environmental condition based upon the sensed ultrasonic energy comprises comparing reflections of the ultrasonic energy generated at the first and second reflection points.

In still other embodiments, a composite temperature sensor includes a sensor portion formed of an environment-resistant ceramic material for sensing temperature in a harsh environment, the sensor portion have a first, sensing end, and a second, mating end, and an ultrasonic transducer coupled directly to the mating end of the sensor portion through an ultrasonically-transparent bond.

Composite sensors consistent with embodiments of the invention include at least a sensor portion and a waveguide portion. The sensor portion in some embodiments may be constructed of a single material that is selected predominantly based upon environment-resistance, e.g., to withstand the rigors of a harsh environment, such as various ceramics, such as aluminum oxide, zirconium oxide, and silicon carbide as well as high temperature alloys such as Nickel alloys, Cobalt alloys, Inconel®, Hastelloy® and their derivatives, as well as refractory materials such as tungsten, platinum and iridium. The harshness of an environment may be based upon one or more environmental characteristics such as temperature, pressure, vibration, causticity, erosiveness, corrosiveness, oxidation, etc. Moreover, other characteristics, e.g., related to the manner in which ultrasonic energy propagates through the material, may also be of concern when selecting an appropriate material. In addition, as will become more apparent below, the sensor portion may also be constructed in some embodiments using two or more components, which may be of the same or different materials, depending upon the needs of a particular application.

The waveguide portion in some embodiments may be constructed of a single material that is ultrasonically-transmissive, e.g., for example metals and alloys such as steel, stainless steel alloys, titanium and titanium alloys, superalloys (e.g. nickel, cobalt, nickel-iron superalloys, for example Inconel® variations), or other materials that are selected predominantly based upon the manner in which ultrasonic energy (e.g., in the form of stress waves) propagates through the material. In addition, while the waveguide portion may not necessarily have the same degree of environment-resistance as the sensor portion, it may nonetheless be desirable to select a material for the waveguide portion to have suitability for harsh environments as well.

Embodiments consistent with the present invention may utilize ultrasonic signals, e.g., in the form of ultrasonic stress waves, and measure temperature and other environmental conditions based at least in part on the ultrasonic signals. Ultrasonic signals may generally be transmitted over a large distance, which enables equipment associated with an ultrasonic sensor to be located remote from the desired sensing location, while still being able to measure environmental conditions at the desired sensing location by utilizing sensors consistent with embodiments of the invention positioned in the desired sensing location.

In one embodiment, for example, a composite sensor may be used to measure temperature in a combustion chamber of a turbine using a sensor portion formed of a ceramic material and a metallic wire filament waveguide. The speed of sound in any medium is generally temperature dependent due to changing elastic modulus; therefore, the measurement of ultrasonic velocity between two points may be used as a temperature measurement with appropriate calibration. In some embodiments, for example, ultrasonic velocity may be measured by measuring a difference in propagation time between two ultrasonic reflection points, e.g., between the end of a sensor portion and a notch formed in the sensor portion (as the end of the sensor portion will also generally operate as a reflection point). A measurement of the velocity between these two reflection points provides (with the appropriate calibration) may be used to provide an average temperature between the reflection points, and generally such a measurement is insensitive to the temperature anywhere else along a waveguide.

Figure 1:
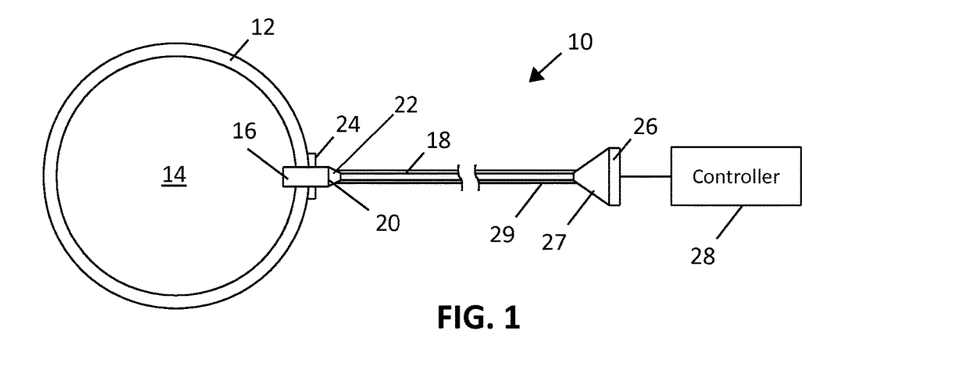
FIG. 1 is a cross-sectional illustration of an example composite active waveguide temperature sensor consistent with embodiments of the invention.

For example, turning to the drawings, where like numbers denote like parts throughout the several views, FIG. 1 illustrates a composite active mechanical waveguide temperature sensor 10 that may be mounted to a turbine engine case 12 to sense temperature inside of a combustion chamber 14. The combustion chamber includes a harsh environment, e.g., reaching a temperature of up to 3500 degrees Fahrenheit and a pressure of about 300-1000 PSI during operation. The sensor portion 16 is formed of ceramic material and projects into combustion chamber 14, and is coupled to a waveguide portion 18 through an ultrasonically-transparent bond 20. The waveguide portion may be, for example, a steel wire having a diameter of less than about 0.125", which permits an ultrasonic signal of about 200 kHz or higher to be propagated through the sensor. In one embodiment, for example, a wire of about 0.014" diameter may be used in connection with an ultrasonic signal of between about 200 kHz and about 10 MHz. A cone 22 may be used to propagate ultrasonic energy between portions 16, 18 in some embodiments, and a mount 24 may be used to secure sensor 10 to turbine engine case 12.

An opposing end of waveguide portion 18 may be coupled to a transducer 26, e.g., a piezoelectric or PZT transducer, through a second cone 27, and a controller 28 may be coupled to transducer 26 to both control both the emission and detection of ultrasonic energy (e.g., in the form of ultrasonic stress waves) by transducer 26. In addition, in some embodiments, a coating or cladding 29 may be used on all or a portion of the waveguide portion 18 to protect the waveguide portion from damage and to reduce dissipation of waveguide energy from the waveguide portion.

In such an embodiment, the ceramic material used for sensor portion 16 may be selected based predominantly upon its environment-resistant properties, e.g., resistance to melting or deformation, resistance to oxidation, strength, elastic modulus, or other material properties. It will be appreciated that these properties may also affect the ultrasonic properties of the material, so while environment-resistance is a predominant concern for the sensor portion, how that environment-resistance impacts the ultrasonic properties of the material is also of concern.

The material used for waveguide portion 18 is likewise selected based predominantly on ultrasonic properties, although additional concerns, e.g., environment-resistance, cost, flexibility, durability, installability, etc., may also be of concern. In many embodiments, for example, a significant benefit of a composite design is the ability to both lower product cost and facilitate installation and usage in a harsh environment. In other embodiments, cost may be an overriding concern, e.g., in an embodiment where a sensor portion is formed of a relatively expensive material such as platinum, pairing that material with a lower cost steel waveguide wire may provide comparable performance to a sensor formed entirely of platinum, but at a significantly lower cost.

In addition, in some embodiments, the composite design enables a waveguide portion having significantly lower environment-resistance to be used in harsh environments. Thus, for example, a thinner waveguide wire may be used to support higher ultrasonic frequencies (e.g., 5 MHz or more), providing higher measurement sensitivity than at lower frequencies, even though the wire would not otherwise be capable of withstanding the environment to which the sensor portion is subjected.

A material is environment-resistant, within the context of the invention, when it is suitable for use in a hostile or harsh environment, and it will be appreciated that this characteristic may vary in different embodiments based upon both the degree and type of hostility an environment presents. A material is ultrasonically-transmissive, within the context of the invention, when it is capable of propagating ultrasonic energy of a desired frequency range with acceptable levels of noise, reflection, dissipation and attenuation.

As noted above, sensor portion 16 and waveguide portion 18 may be coupled to one another through an ultrasonically-transparent bond 20. A bond is ultrasonically-transparent to the extent that an ultrasonic signal propagated across the bond has acceptable levels of noise, reflection, dissipation and attenuation. While a number of different techniques may be used to form an ultrasonically-transparent bond, in one embodiment, where a ceramic sensor portion is coupled to a waveguide wire, brazing can be used to join the ceramic sensor portion to the waveguide wire. Other techniques, such as soldering, adhesive bonding, shrink or press fits, or other forms of mechanical fastening, may be used in the alternative, and it will be appreciated that different techniques may be better suited than others based upon the properties of the respective portions.

As also noted above, one or more cones 22, 27, or conical transformers, may be used in some embodiments to propagate ultrasonic energy between waveguide portion 18 and sensor portion 16 and/or transducer 26. In some embodiments, the cones may be phase matched cones employing geometries and materials (e.g., acrylic) with properties well suited for efficiently propagating ultrasonic energy to or from the waveguide portion of the composite sensor, e.g., as described in U.S. Provisional Application No. 61/977,302, filed Apr. 9, 2014 by Oleg Lobkis et al., and entitled "ACTIVE WAVE GUIDE EXCITATION AND COMPENSATION," the disclosure of which is incorporated by reference herein in its entirety. Ultrasonically-transparent bonds may also be formed between cones 22, 27 and portions 16, 18 and/or transducer 26. In addition, in some embodiments, a cone may be integrally formed, for example, with sensor portion 16 or waveguide portion 18. Thus, for example, if cone 22 is integrally formed with sensor portion 16, the ultrasonically-transparent bond 20 may join waveguide portion 18 to cone 22, whereas if cone 22 is integrally formed with waveguide portion 18, the ultrasonically-transparent bond 20 may join sensor portion 16 to cone 22.

In some embodiments of the invention, the sensor may measure an ultrasonic characteristic that varies as a function of temperature or another environmental condition to be measured. The ultrasonic characteristic may be based, for example, on the phase of an ultrasonic signal, amplitude of an ultrasonic signal, frequency of an ultrasonic signal, and/or propagation delay of an ultrasonic signal. Consistent with embodiments of the invention, an environmental condition monitored by the sensor may be measured by measuring the difference in one or more of the ultrasonic signal transmission characteristics.

Systems and methods consistent with various aspects of the invention may be utilized to transmit and sense ultrasonic signals. In some embodiments, an ultrasonic signal may be transmitted through the waveguide wire, and the sensed ultrasonic signal may include a reflection or echo of the transmitted ultrasonic signal. In some embodiments, an ultrasonic signal may be transmitted through the waveguide wire, and the sensed ultrasonic signal may include a portion of the transmitted ultrasonic signal. In some embodiments, an ultrasonic signal may be transmitted through the waveguide wire, and the sensed ultrasonic signal may be a modification of the transmitted ultrasonic signal. In other embodiments, a waveguide wire may have a first end and a second end, and an ultrasonic signal may be transmitted through the wire at the first end, and an ultrasonic signal may be sensed through the wire at a second end, and the sensed ultrasonic signal may be based at least in part on the transmitted ultrasonic signal. The frequency of a transmitted ultrasonic signal may vary in different embodiments, although in many embodiments, a transmitted ultrasonic signal of between about 100 KHz and about 10 MHz, may be used.

As the sensors may be positioned to measure environmental conditions in sensing locations typically considered harsh sensing environments, materials suitable for harsh environments may be utilized in various combinations to construct sensors consistent with some embodiments of the invention. Moreover, the materials and configurations of waveguide wires consistent with embodiments of the invention may comprise similarly suitable materials. In addition, waveguide wires consistent with embodiments of the invention generally include material properties making the waveguide wires suitable for transmission of ultrasonic signals, including for example, various metals and alloys. Furthermore, while some embodiments include waveguide wires comprising a uniform construction, other embodiments may include waveguide wires advantageously comprising braided constructions, where braided constructions may provide higher tensile strengths in some embodiments. Uniformly constructed and braided wires comprising diameters between about 0.001 inches and about 0.50 inches, or more particularly diameters between 0.005 inches and 0.25 inches may be used. The cross-sectional shapes of waveguide wires may vary in different embodiments, although in many embodiments, the cross-sectional shapes in many embodiments may include shapes that may be configured to transmit ultrasonic signals consistent with embodiments of the invention, including, for example substantially circular cross-sectional wires, substantially rectangular cross-sectional wires, substantially ribbon cross-sectional wires, etc.

In embodiments including a common transmitting and receiving end, such as the sensor shown in FIG. 1, a pulse/echo transmitting and sensing method may be utilized. In these embodiments, an ultrasonic signal may be transmitted through waveguide wire 18 to sensor portion 16, and an ultrasonic signal may be sensed from sensor portion 16 and wire 18, where the sensed ultrasonic signal may comprise an echo of the transmitted ultrasonic signal. As such, analysis of the sensed ultrasonic signal to determine a temperature measurement may include comparing the transmitted ultrasonic signal to the sensed echo. As the ultrasonic signal transmission characteristics of sensor portion 16 and wire 18 may vary with temperature, the transmitted ultrasonic signal may include one or more signal characteristics that differ from the sensed echo. The transmitted ultrasonic signal and the sensed echo may therefore be analyzed to determine one or more signal characteristics that vary between the transmitted ultrasonic signal and the sensed echo, and may therefore determine one or more ultrasonic signal transmission characteristics that varied in response to temperature.

In addition, in order to measure temperature in a particular region of the sensor, it may be desirable to introduce one or more reflection points in the sensor, whether in a sensor portion, a waveguide portion, or both. For example, a reflection point defining a sensing region may be created by introducing a notch on the sensor, adding a sleeve, stepping up/down in cross-section, or otherwise modifying the geometry in some way such that an ultrasonic stress wave is both reflected and transmitted from this point, such that the sensor is only sensitive to temperature variations in that region. In addition, it will be appreciated that multiple sensing regions may be created on the same sensor "network," allowing multiple regions to be sensed simultaneously. In some embodiments, for example, it may be desirable to define sensing regions in both a sensor portion and a waveguide portion to enable an ambient temperature to be measured with the waveguide sensing region concurrently with measuring temperature with the sensor portion. Additional details regarding reflection points, as well as other techniques that may be used in connection with a composite sensor as described herein may be found, for example, U.S. Provisional Application No. 61/898,788, filed Nov. 1, 2013 by Christopher G. Larsen et al., and entitled "BROADBAND WAVEGUIDE," the disclosure of which is incorporated by reference herein in its entirety.

Figure 4:
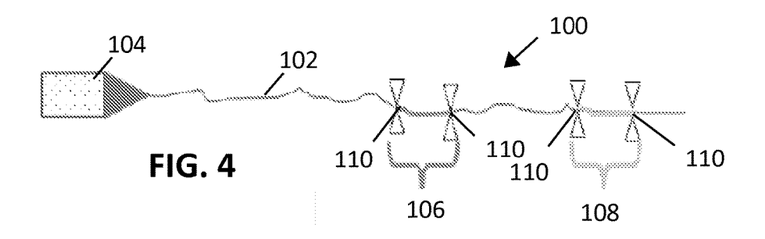
FIG. 4 is an illustration of one embodiment of a sensor including sensing regions in a waveguide portion.
Figure 5:
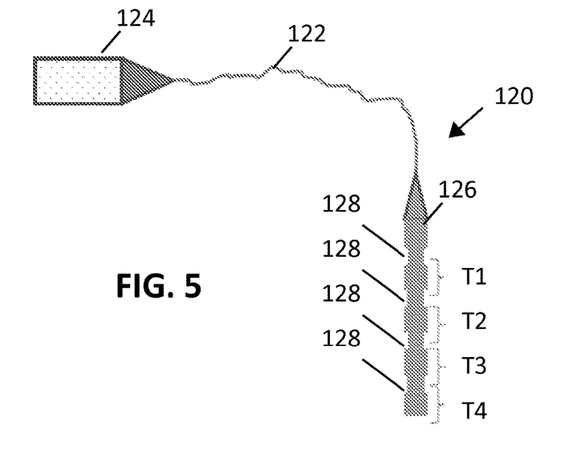
FIG. 5 is an illustration of one embodiment of a sensor including sensing regions in a sensor portion.
Figure 6:
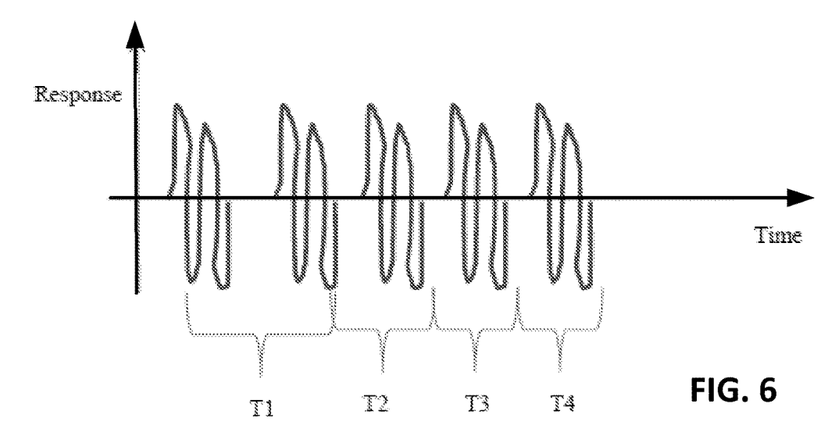
FIG. 6 is a graph of example reflections generated by the reflection points in the sensor of FIG. 5.

FIG. 4, for example, illustrates an example sensor 100 having a waveguide 102 and ultrasonic transducer/receiver 104, along with two temperature sensors, or sensing regions, 106, 108 with reflection points defined by a plurality of notches or sleeves 110 formed in or on waveguide 102. Likewise, FIG. 5 illustrates an example sensor 120 having a waveguide 122, ultrasonic transducer/receiver 124, and an environment-resistant sensor portion 126, within which multiple notches or sleeves 128 are defined to create reflection points suitable for implementing a temperature gradient sensor with a plurality of steps T1-T4, and whereby the difference in time between reflections is related to the temperature between steps T1-T4. FIG. 6, for example, illustrates an example response from sensor 120, and it will be appreciated that by measuring the time between the different reflections (not shown to scale), one can measure the temperature at the different measurement regions creating an array of discrete temperature measurement points. It will be appreciated that reflection points may be formed in a waveguide and/or sensor portion in a number of manners consistent with the invention, e.g., via notches, sleeves, stepping up/down in cross-section, modifying the geometry in some way such that an ultrasonic stress wave is both reflected and transmitted from a particular point, etc., so the invention is not limited to the specific reflection point implementations discussed herein.

In some embodiments, time of flight differences between reflected pulses for two reflection points may be used to measure temperature in a sensing region, rather than measuring differences between reflected and sent signals. In addition, in some embodiments, the same transducer may be used for receiving and transmitting. In addition to measuring the time of flight between the two reflections, the resonant frequency or phase may also be tracked. The frequency (or phase) shift may be proportional to the temperature between the reflection points.

Figure 2:
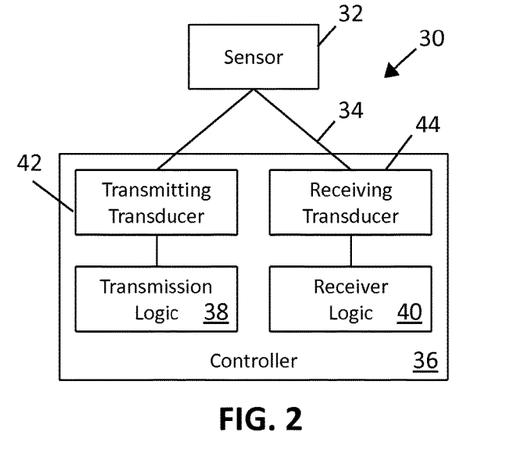
FIG. 2 is a block diagram of one embodiment of an apparatus including the sensor of FIG. 1.

FIG. 2 illustrates an example apparatus 30 consistent with embodiments of the invention and to measure an environmental condition in a sensing location, which may be in a harsh environment. Apparatus 30 may include a composite sensor having a sensor portion 32 including a waveguide portion 34 coupled to a controller 36. In this embodiment, controller 36 includes separate transmission and receiver logic 38, 40, as well as separate transmitting and receiving transducers 42, 44 coupled to opposite ends of waveguide wire portion 34. Thus, unlike sensor 10 of FIG. 1, ultrasonic energy is introduced at one end of waveguide portion 34 and sensed at the other end of waveguide portion 34, and a transmission characteristic such as propagation delay is used to sense an environmental condition. In this embodiment, transmission logic 38 generates an excitation signal that is received by transmitting transducer 42 and used by transducer 42 coupled to one end of waveguide portion 34 to impart ultrasonic energy corresponding to the excitation signal to the waveguide portion. Receiving transducer 44 coupled to the other end of waveguide portion 34 demodulates the ultrasonic energy propagated through waveguide portion 34 and generates a return signal that is transmitted to receiver logic 40, which then processes the return signal to determine the environmental condition, e.g., temperature.

Figure 3:
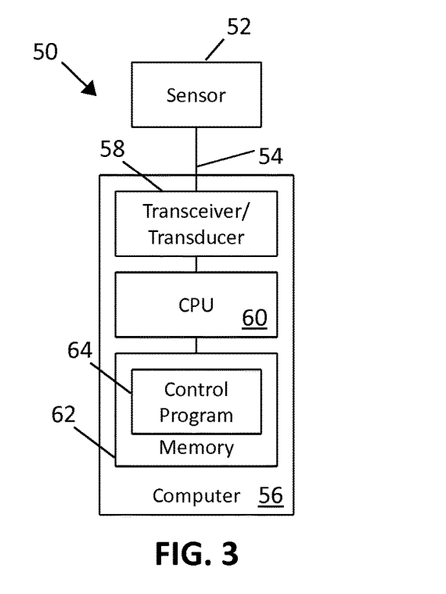
FIG. 3 is a block diagram of another embodiment of an apparatus including the sensor of FIG. 1.

FIG. 3 illustrates an alternate apparatus 50 consistent with other embodiments of the invention and to measure an environmental condition in a sensing location using a composite sensor with a sensor portion 52 and a waveguide portion 54 coupled to a computer 56 including transceiver/transducer logic 58, a central processing unit 60 including at least one processor, and a memory 62 within which is stored a control program 64 that, when executed, both generates a signal that causes excitation of the sensor with ultrasonic energy as well as processes a return signal that is representative of the propagated ultrasonic signal to determine the environmental condition.

As should be apparent from FIGS. 2-3, various hardware and/or software configurations may be utilized to implement the herein-described functionality, and may include dedicated hardware logic disposed in one or more electronic circuits and/or integrated circuits, and/or programmable logic and/or a programmable electronic device such as a computer that executes program code. In addition, in some embodiments, processing may be implemented using approaches other than a computer, such as analog preprocessing and a timer. Furthermore, it should be appreciated that the functionality associated with generating an excitation signal, exciting a sensor to impart ultrasonic energy and stress waves to the sensor in response to such an excitation signal, receiving, detecting or sensing the propagated ultrasonic energy (whether transmitted or reflected), generating a return signal representative of such propagated ultrasonic energy, and processing the return signal to calculate a measurement for an environmental condition, and compensate for other environmental conditions and effects may be combined or separated in various embodiments consistent with the invention.

In addition, any software routines executed to implement the embodiments disclosed herein, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, embedded hardware, etc., and that, when read and executed by one or more processors in a computer, cause that computer to perform the steps necessary to execute steps or elements embodying desired functionality. Moreover, while some embodiments have and hereinafter will be described in the context of fully functioning computers and computer systems, those skilled in the art will appreciate that some embodiments are capable of being distributed as a program product in a variety of forms, and that the invention applies equally regardless of the particular type of computer readable media used to actually carry out the distribution, including, for example, computer readable storage media, which is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In addition, as is generally known in the field, signal processing methods including filtering, Fourier transform, demodulation, and Hilbert transform processing methods may be used to determine one or more ultrasonic signal transmission characteristics. In some embodiments, an apparatus may perform one or more signal processing operations on the ultrasonic signal sensed on a wire to determine one or more ultrasonic signal transmission characteristics of the wire as well as the variance of one or more ultrasonic signal transmission characteristics of the wire.

Those skilled in the art will recognize that the example environments illustrated in FIGS. 1-3 are not intended to limit the invention. Indeed, other modifications that may be made to the aforementioned embodiments, e.g., as described in the aforementioned publication incorporated by reference herein, will be apparent to one of ordinary skill in the art having the benefit of the instant disclosure.

Figure 7:
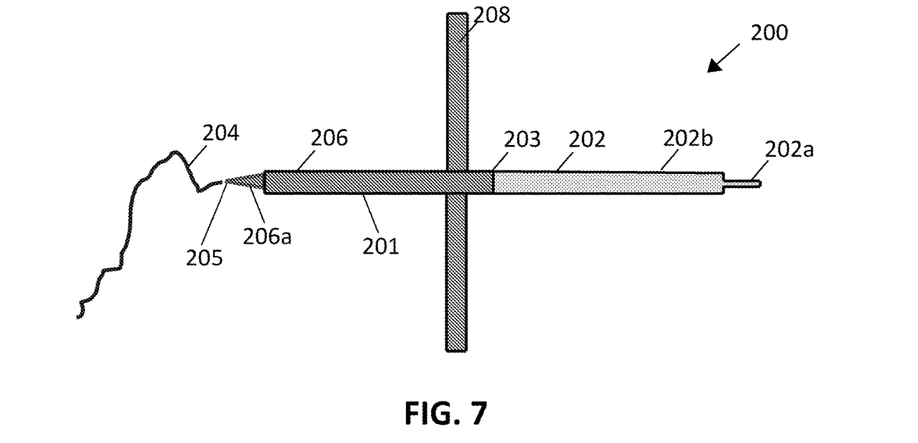
FIG. 7 is an illustration of one embodiment of a sensor including a transition component.

Now turning to FIG. 7, another example implementation of a composite sensor 200 that includes a sensor portion 201 and a waveguide portion 204, but with sensor portion 201 including two components, a sensor component 202 and a transition component 206, joined to one another using an ultrasonically-transparent bond 203. Sensor portion 201 is also mounted to a mounting component or plate 208 for attachment of the sensor to a sensing location, e.g., a port on a turbine engine.

In this embodiment, sensor component 202 and transition component 206 may be substantially cylindrical over a majority of their lengths (i.e., each has a circular cross-section), and sensor component 202 may be formed of a high temperature ceramic material, and may include a sensor tip 202a having a reduced diameter relative to the main body 202b of the sensor component. The waveguide wire may be formed of stainless steel wire, and both the transition component and mounting may be formed of a nickel-chromium alloy such as Inconel® 601. In this embodiment, transition component 206 and mounting plate 208 may be joined by a welded junction, e.g., via tungsten inert gas (TIG) welding using a small fillet on one side of the mounting plate. Other attachments, e.g., brazing, may be used in other embodiments. Transition component 206 may also include a cone 206a to transition from the wire diameter and the diameter of the ceramic, sensor component, and by welding the transition component to the mounting plate, the mounting plate serves to seal the sensor when installed in a sensing location. While components 202, 206 are formed of different materials in this embodiment, in other embodiments, the sensor and transition components may be formed of the same material, or, as detailed below in connection with FIG. 10, the sensor and transition components may be integrated into a single body sensor portion 201 formed of a single material.

In one non-limiting embodiment, composite sensor 200 may be configured as an active mechanical waveguide temperature sensor suitable for installation in a turbine inlet location on a Rolls-Royce/Allison 501K industrial turbine engine, e.g., in ports that are ordinarily used for thermocouples used during setup of a control system or for diagnostics. Thermocouples are generally not used for normal operation due to limited lifetimes in the harsh environment presented during normal operation. As such, a mounting plate 208 may be used on sensor 200 that is compatible with the mounting configuration used for a thermocouple in the existing ports. In this embodiment, transition component 206 is about 52 mm in length, with about 3 mm projecting beyond mounting plate 208 on the side of sensor component 202, and with sensor component 202 extending about 54 mm overall, with sensor tip 202a being about 1 mm to about 25 mm in length (or longer) and main body 202b about 49 mm in length, with the step down in diameter from main body 202b to sensor tip 202a defining a reflection point for the sensor. Both transition component 206 and main body 202b of sensor component 202 in this embodiment have a diameter of about 3 mm to about 10 mm, with sensor tip 202a having a diameter of about 1 mm.

Ultrasonically-transparent bonds 203, 205 may be formed both between sensor component 202 and transition component 206, and between waveguide wire 204 and transition component 206. Waveguide wire 204 may be joined with transition component 206 at a tapered end defined by cone 206a (which may be configured as a phase matched cone), e.g., by soldering or brazing. Sensor component 202 and transition component 206 may be joined, for example, using brazing, e.g., between opposing flat surfaces.

Figure 8:
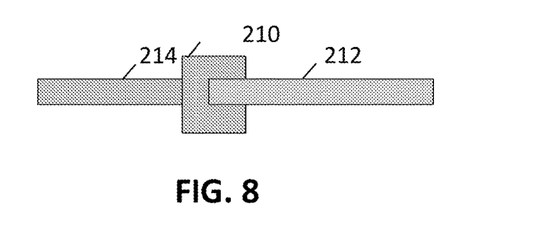
FIG. 8 is an illustration of one alternative joint to that illustrated in FIG. 7.

Alternatively, as illustrated in FIG. 8, a cup joint 210 may be formed between a sensor component 212 and a transition component 214, with an enlarged mating end of transition component 214 forming a cup or recess within which a corresponding mating end of sensor component 212 is inserted such that a portion of transition component 214 circumscribes and/or envelopes the end of sensor component 212. The use of a cup joint may provide increased mechanical robustness, as well as more surface area for a brazing alloy to bond the alloy in the transition component to the ceramic material in the sensor component. The use of a cup may also help to align the ceramic sensor component and the transition component during manufacturing. In other embodiments, a cup or recess may be formed in the sensor component such that the transition component is inserted into the sensor component.

Figure 9:
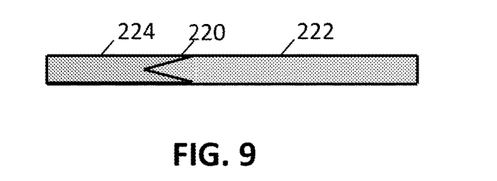
FIG. 9 is an illustration of another alternative joint to that illustrated in FIG. 7.

As another alternative, FIG. 9 illustrates a joint 220 formed by mating V-shaped ends of a sensor component 222 and transition component 224. A mating end of sensor component 222 may be considered to have an "inverse V" shaped end, while the corresponding mating end of transition component 224 may be considered to have a "V" shaped end, and brazing material may be used to join the two mating ends together in the configuration illustrated in FIG. 9. It will be appreciated that other cross-sectional geometries may be used, and the shapes of the respective sensor component 222 and transition component 224 may be reversed in some embodiments. Therefore, the invention is not limited to the particular joints and joint geometries described herein.

Figure 10:
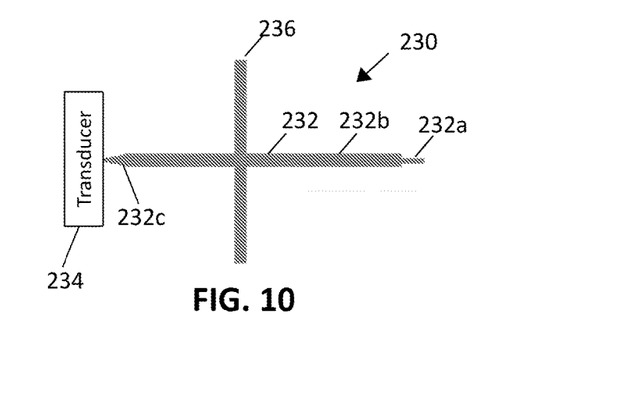
FIG. 10 is an illustration of one embodiment of a unibody sensor including a direct coupling to a transducer.

FIG. 10 illustrates another composite sensor 230 that is similar to sensor 200 of FIG. 7, but that incorporates a sensor portion 232 formed of a single environment-resistant material, e.g., ceramic or a nickel-chromium alloy such as Inconel® 601. In addition, while sensor 230 may be used in connection with a waveguide portion similar to waveguide portion 204 of FIG. 7, in some embodiments sensor 230 may incorporate a direct coupling or connection between sensor portion 232 and an ultrasonic transducer 234, such that no waveguide wire may be used. Ultrasonic transducer 234 may be piezoelectric or PZT transducer, among others, and may be configured to couple to an end face or other outer surface proximate a mating end of sensor portion 232, and opposite of a sensing end (e.g., proximate a sensor tip 232a). As with sensor 200, sensor 230 may also incorporate a main body 232b and a cone 232c into sensor portion 232, and a mounting plate 236 may be used to mount the sensor to a sensing location.

It will be appreciated that in any of the sensors illustrated in FIGS. 7-10, two reflection points may be defined respectively at an end of the sensor portion (e.g., at the end of the sensor tip) and at an intermediate location on the sensor portion (e.g., at the step down defining the sensor tip from the main body). As such, ultrasonic energy propagated through the sensor portion may generate reflections generated at both reflection points, and an environmental condition such as temperature may be determined based upon a comparison of the reflections, e.g., based on time of flight, resonant frequency, or phase, among other techniques disclosed herein or that would otherwise be appreciated by one of ordinary skill in the art having the benefit of the instant disclosure.

While the present invention has been illustrated by a description of the various embodiments and examples, and while these embodiments have been described in considerable detail, it is not the intention of the applicants to restrict or in any way limit the scope of the appended claims to such detail. Additional advantages and modifications will readily appear to those skilled in the art.

Moreover, sensors and sensing methods consistent with the invention may be used in sensing environments that conventional sensors and sensing methods generally provide inaccurate results and/or fail completely. Embodiments consistent with the invention may be utilized in a variety of applications where the sensing locations typically are too harsh for conventional sensors and/or sensing methods. Harsh sensing environments typically include one or more extreme environmental conditions that cause inaccurate readings and/or failure of conventions sensors, extreme environmental conditions generally problematic for conventional sensors include, for example, high temperature, high pressure, high strain, high vibrations, wide variations in temperature during operation (i.e. broad temperature range), wide variations in pressure during operation (i.e. broad pressure range), etc. As such, sensors and sensing methods consistent with the invention may be utilized in such harsh sensing environments including, for example, high temperature, pressure, vibration, and/or strain locations in engines (e.g. combustion chambers of aero gas turbine engines), high temperature, pressure, vibration, and/or strain locations in industrial machinery, etc.

As sensors and sensing methods consistent with the invention may transmit ultrasonic signals through wires of substantial length, controllers and or other devices used to analyze the ultrasonic signals to determine a measurement of one or more environmental conditions of a harsh sensing location may be remote from the harsh sensing location thereby increasing the reliability of components that may be particularly sensitive to the environmental conditions of the harsh sensing location. Therefore, sensors and sensing methods consistent with the invention may be utilized in a wide variety of applications to provide improved sensors and sensing methods as compared to conventional sensors and sensing methods. In addition, sensors and sensing methods consistent with the invention may be utilized in a wide variety of applications where conventional sensing technology is unreliable, inaccurate and/or inoperable.

For example, while the invention is described above in connection with the measurement of temperature in the combustion chamber of a turbine, it will be appreciated that a sensor consistent with the invention may be used in connection with measuring other environmental conditions, e.g., pressure, force, acceleration, strain, vibration, and that such a sensor may be used to measure environmental conditions in other areas of a turbine, e.g., in a turbine inlet, between high and low pressure turbine sections, in an exhaust stream, or other turbine components. Sensors consistent with the invention may also be used in connection with turbines for aircraft and other vehicles, as well as in turbines used for other applications, e.g., for power generation. Furthermore, sensors consistent with the invention may be used in an innumerable number of other applications where harsh environmental conditions exist.

Thus, the invention in its broader aspects is therefore not limited to the specific details and representative apparatuses shown and described. Accordingly, departures may be made from such details without departing from the spirit or scope of applicants' general inventive concept.

What is claimed is:

1. A composite sensor comprising:
   a solid and non-flexible sensor component formed of an environment-resistant material for sensing an environmental condition in an environment;
   a solid and non-flexible transition component having first and second ends and formed of a first ultrasonically-transmissive material that is different from, and has a lower environment-resistance than, the environment-resistant material, the transition component coupled proximate the first end to the sensor component through a first ultrasonically-transparent bond; and
   a solid and flexible waveguide portion including a wire filament formed of a second ultrasonically-transmissive material that is different from, and has a lower environment-resistance than, the environment-resistant material, the waveguide portion coupled to the transition component proximate the second end of the transition component through a second ultrasonically-transparent bond;
   wherein the sensor component, transition component and waveguide portion are each configured to propagate ultrasonic mechanical stress waves generated by a transducer coupled to the solid and flexible waveguide portion when sensing the environmental condition.

2. The sensor of claim 1, wherein the environment-resistant material is a ceramic material.

3. The sensor of claim 1, wherein the environment-resistant material is a refractory material.

4. The sensor of claim 1, wherein each of the first and second ultrasonically-transmissive materials is a metal.

5. The sensor of claim 4, wherein the second ultrasonically-transmissive material comprises a steel wire filament.

6. The sensor of claim 1, further comprising a cone coupling the waveguide portion to the transition component.

7. The sensor of claim 1, wherein each of the first and second ultrasonically-transparent bonds comprises a bond formed by brazing, soldering, adhesive, press-fit, or mechanical fastening.

8. The sensor of claim 1, wherein the environment is a high temperature environment capable of reaching up to 3500 degrees Fahrenheit.

9. The sensor of claim 1, wherein the environment is a high pressure environment capable of reaching up to 300 to 1000 PSI.

10. The sensor of claim 1, wherein the environment is a caustic environment or an erosive environment.

11. The sensor of claim 1, wherein the waveguide portion has a diameter of less than or equal to 0.125" and is transmissive of an ultrasonic signal of at least 200 kHz.

12. The sensor of claim 1, wherein the sensor is adapted to sense temperature in a turbine combustion chamber.

13. The sensor of claim 1, further comprising at least one reflection point defining at least one sensing region for sensing the environmental condition.

14. The sensor of claim 13, wherein the at least one reflection point includes a reflection point in the sensor component.

15. The sensor of claim 13, wherein the at least one reflection point includes a reflection point in the waveguide portion.

16. The sensor of claim 1, wherein the sensor component is formed of a ceramic material and the transition component is formed of a nickel-chromium alloy.

17. The sensor of claim 1, further comprising a mounting plate welded to the transition component.

18. The sensor of claim 1, wherein the sensor component is brazed to the transition component.

19. The sensor of claim 1, wherein a mating end of the sensor component is received in a cup defined on the first end of the transition component.

20. The sensor of claim 1, wherein a mating end of the sensor component has an inverse V configuration and the first end of the transition component has a V configuration such that the mating end of the sensor component is received in the first end of the transition component.

21. The sensor of claim 20, wherein the first ultrasonically-transparent bond comprises a bond formed between the mating end of the sensor component and the first end of the transition component by brazing, soldering, adhesive, press-fit, or mechanical fastening.

22. The composite sensor of claim 1, wherein the first and second ultrasonically-transmissive materials are the same material.

23. The composite sensor of claim 1, wherein the first and second ultrasonically-transmissive materials are different from one another.

24. The sensor of claim 1, wherein the sensor component and the transition component are generally cylindrical and have substantially a same diameter proximate the first ultrasonically-transparent bond.

25. The sensor of claim 1, wherein the environment-resistant material includes aluminum oxide.

26. A temperature sensor, comprising:
   a solid and non-flexible sensor component formed of an environment-resistant material and configured to sense a temperature in an environment;
   a solid and non-flexible transition component having first and second ends and formed of a metal having a lower environment-resistance than the environment-resistant material, the transition component coupled proximate the first end to the sensor component through a first ultrasonically-transparent bond;
   a solid and flexible waveguide portion formed of a metal wire filament having a diameter of less than or equal to 0.125" and a lower environment-resistance than the environment-resistant material, the waveguide portion coupled to the transition component proximate the second end of the transition component through a second ultrasonically-transparent bond; and
   a transducer coupled to the waveguide portion at an opposite end from the sensor portion and configured to propagate an ultrasonic mechanical stress wave signal of at least 200 kHz through the sensor to measure an ultrasonic signal transmission characteristic of the sensor that varies in response to temperature in the environment.

27. An apparatus, comprising:
   a composite sensor including,
      a solid and non-flexible sensor component formed of an environment-resistant material for sensing an environmental condition in an environment;

a solid and non-flexible transition component having first and second ends and formed of a first ultrasonically-transmissive material that is different from, and has a lower environment-resistance than, the environment-resistant material, the transition component coupled proximate the first end to the sensor component through a first ultrasonically-transparent bond; and a solid and flexible waveguide portion including a wire filament formed of a second ultrasonically-transmissive material that is different from, and has a lower environment-resistance than, the environment-resistant material, the waveguide portion coupled to the transition component proximate the second end of the transition component through a second ultrasonically-transparent bond; and control logic configured to generate an ultrasonic signal and propagate the ultrasonic energy as a mechanical stress wave signal through the composite sensor, the control logic further configured to sense the ultrasonic energy propagated through the composite sensor and determine the environmental condition based upon the sensed ultrasonic energy.

28. A method of measuring an environmental condition in an environment with a composite sensor of the type that includes a solid and non-flexible sensor component formed of an environment-resistant material, a solid and non-flexible transition component having first and second ends and formed of a first ultrasonically-transmissive material that is different from, and has a lower environment-resistance than, the environment-resistant material, and a solid and flexible waveguide portion including a wire filament formed of a second ultrasonically-transmissive material that is different from, and has a lower environment-resistance than, the environment-resistant material, wherein the transition component is coupled proximate the first end to the sensor component through a first ultrasonically-transparent bond, and wherein the waveguide portion is coupled to the transition component proximate the second end of the transition component through a second ultrasonically-transparent bond, the method comprising:

propagating ultrasonic energy generated by a transducer through the waveguide portion, the transition component and the sensor component of the composite sensor as mechanical stress waves;

sensing the ultrasonic energy propagated through the waveguide portion, the transition component and the sensor component of the composite sensor; and determining the environmental condition based upon the sensed ultrasonic energy.

29. The method of claim 28, wherein determining the environmental condition based upon the sensed ultrasonic energy comprises determining the environmental condition based upon time of flight, resonant frequency, or phase.

30. The method of claim 28, wherein the sensor component includes first and second reflection points defined respectively at an end and an intermediate location on the sensor component, and wherein determining the environmental condition based upon the sensed ultrasonic energy comprises comparing reflections of the ultrasonic energy generated at the first and second reflection points.

* * * * *